(12) United States Patent
Maitland et al.

(10) Patent No.: US 7,307,453 B1
(45) Date of Patent: Dec. 11, 2007

(54) METHOD AND SYSTEM FOR PARALLEL STATE MACHINE IMPLEMENTATION

(75) Inventors: Roger Maitland, Woodlawn (CA);
Mark Turnbull, Stittsville (CA)

(73) Assignee: Nortel Networks Limited, Paris (FR)

( * ) Notice: Subject to any disclaimer, the term of this patent is extended or adjusted under 35 U.S.C. 154(b) by 139 days.

(21) Appl. No.: 10/961,058

(22) Filed: Oct. 12, 2004

(51) Int. Cl.
G06F 7/38 (2006.01)
H03K 19/173 (2006.01)

(52) U.S. Cl. ............................... 326/46; 341/107; 711/5

(58) Field of Classification Search ................... 326/46; 712/2–4; 341/50–107; 710/240–244; 711/147–153
See application file for complete search history.

(56) References Cited

U.S. PATENT DOCUMENTS

| | | | | |
|---|---|---|---|---|
| 5,173,694 A | * | 12/1992 | Lynch et al. ................... | 341/59 |
| 5,177,482 A | * | 1/1993 | Cideciyan et al. ............ | 341/59 |
| 5,179,705 A | * | 1/1993 | Kent ........................... | 710/241 |
| 5,455,578 A | * | 10/1995 | Bhandari ...................... | 341/51 |
| 5,475,388 A | * | 12/1995 | Gormish et al. ............. | 341/107 |
| 5,764,078 A | * | 6/1998 | Agrawal et al. .............. | 326/40 |
| 5,907,565 A | * | 5/1999 | Alamouti ..................... | 714/792 |
| 5,931,965 A | * | 8/1999 | Alamouti ..................... | 714/792 |
| 6,188,699 B1 | * | 2/2001 | Lang et al. .................. | 370/463 |
| 6,223,320 B1 | * | 4/2001 | Dubey et al. ................ | 714/757 |
| 6,334,176 B1 | * | 12/2001 | Scales et al. ................... | 712/4 |
| 6,628,215 B2 | * | 9/2003 | Talwar et al. ................ | 341/107 |
| 6,715,024 B1 | * | 3/2004 | Lin ................................ | 711/5 |
| 2004/0054848 A1 | * | 3/2004 | Folsom ........................ | 711/108 |
| 2005/0035784 A1 | * | 2/2005 | Gould et al. ................... | 326/46 |
| 2005/0129028 A1 | * | 6/2005 | Peeters et al. .......... | 370/395.21 |
| 2005/0163313 A1 | * | 7/2005 | Maitland et al. .............. | 380/28 |

OTHER PUBLICATIONS

Freescale Semiconductor, Inc; Isn't It Time You Got Faster, Quicker?, AltiVec Technology At-a-Glance, 2002 month n/a.*
http://www.simdtech.org/altivec SIMD tech; Altivec Technology, copyright © 2003 SIMD, month n/a.
http://www.freescale.com/webapp/sps/site/overview.jsp?nodeId=018rH3bTdGmKqW5Nf2 freescale semiconductor; ALTIVEC™, Oct. 6, 2004, p. 1-3.
Freescale Semiconductor, Inc.; Isn't It Time You Got Faster, Quicker?, AltiVec™ Technology At-a-Glance, 2002, month n/a.

* cited by examiner

Primary Examiner—Rexford Barnie
Assistant Examiner—Jason Crawford
(74) Attorney, Agent, or Firm—Sughrue Mion, PLLC

(57) ABSTRACT

Methods and computer readable media are provided for implementing state machines in parallel. A control vector is generated from current state and input bits. This vector is then used to determine the next state and any output bits for each of a plurality of state machines in parallel. In some implementations, the Altivec vperm instruction is used to perform a parallel table look-up.

19 Claims, 5 Drawing Sheets

TRANSMITTER: 1) INSERT FRAMING BITS CONSISTING OF "01111110"
2) REPLACE OCCURRENCES OF 5 "1"s IN DATA WITH 5 "1"s AND "0".

RECEIVER: 1) LOOK FOR FRAMING BITS – ONE BIT AT A TIME
2) LOOK FOR AND UNDO BIT STUFFING

METHOD AND SYSTEM FOR PARALLEL STATE MACHINE IMPLEMENTATION

FIELD OF THE INVENTION

The invention relates to state machine implementations.

BACKGROUND OF THE INVENTION

State machines are a fundamental part of much electronic equipment. An example of a very simple state machine is shown in FIG. 1. This state machine has four states S1 10, S2 12, S3 14, S4 16. Also shown are various possible transitions between states. These include transition 18 between S1 10 and S2 12; transition 20 between S2 12 and S4 16, transition 22 between S4 16 and S3 14; transition 24 between S2 12 and S3 14, and finally transition 26 between S3 14 and S1 10. At each iteration of the state machine, the current state, be that either S1, S2, S3 or S4, and a current input which might take the form of several bits, are processed and a new "next state" is determined. The possible next states are represented by the transitions in FIG. 1. Such a state computation might also determine an output that is produced at the particular state transition. For example, when a transition from state S1 10 to S2 12 occurs, three bits of output might be generated at that time.

State machines have been implemented with mechanical devices, electronic hardware and software techniques. Most software programming of state machines is done now using high level object oriented techniques that can be very slow.

An example of a Mealy hardware implementation of a state machine is shown in FIG. 2. In this example, input bits 30 and a current state 34 are input to combinatorial logic 32. Combinatorial logic 32 determines the next state 36 on the basis of the input bits 30 and the current state 34. The next state is then stored using a flip flop 38 and that state now becomes the current state 34 for use in the next iteration. Additional combinatorial logic 40 takes the input bits 30 and the current state 34 and determines any output 42. There are well known techniques for determining appropriate combinatorial logic 32 to implement a particular state machine.

SUMMARY OF THE INVENTION

Methods and computer readable media are provided for parallel state machine implementations. These are particularly useful when there are a large number of state machines to run that change states frequently.

One broad aspect provides a method of performing state machine transitions comprising combining an input vector containing at least one input bit for each of a plurality of state machines with a current state vector containing at least one current state bit for each of the plurality of state machines to generate a control vector; and using the control vector, determining in a parallel manner at least one bit representing a next state for each state machine.

In some embodiments, determining comprises performing a first parallel table look-up using the control vector to look-up the first respective table output for each of the state machines.

In some embodiments, the respective table output comprises at least one bit representing a next state for each state machine and at least one output bit for each state machine.

In some embodiments, the method further comprises performing at least a second parallel table look-up using the control vector to look-up at least a second respective table output for each of the state machines, wherein the first and the at least a second table outputs for each state machine collectively comprise at least one bit representing the next state and output bits.

In some embodiments, combining the input vector containing at least one input bit for each of the plurality of state machines with the current state vector containing at least one current state bit for each of the plurality of state machines to generate the control vector comprises: producing a shifted vector by performing a vector shift operation on one of the input vector and the current state vector such that the bits of each element are shifted by enough bits to store bits of the other of the input vector and the current state vector current state; executing a vector bit-wise OR of the shifted vector with the other of the input vector and the current state vector to produce the control input.

In some embodiments, the method further comprises storing a table for use in the parallel table look-up in a first register; storing the control vector in a second register; providing the first register and second register as inputs to a vector permutation operation to implement the parallel table look-up.

In some embodiments, the method further comprises storing a table for use in the parallel table look-up partly in a first register and partly in a second register; storing the control vector in a third register; providing the first register, the second register and the third register as inputs to a three input vector permutation operation to implement the parallel table look-up.

In some embodiments, the parallel table look-up is performed using a vperm instruction.

In some embodiments, the method is adapted to implement a plurality of HDLC state machines in parallel, wherein the current state is represented by five bits and the current input is represented by one bit for each state machine.

In some embodiments, the method comprises storing 64 table lookup entries in four 16-element vector registers; generating the control vector as a 16 element control vector containing five bits of the six bits of current state and current input; using the control vector to look-up two sets of 16 element parallel outputs; selecting between two elements in the two parallel outputs for each of 16 state machines on the basis of the remaining bit of the six bits for that state machine.

Another broad aspect provides a computer readable medium having processor executable instructions thereon for implementation by a vector processor, the instructions providing one of the above summarized methods of performing state machine transitions.

Another broad aspect of the invention provides a parallel state machine calculator adapted to implement one of the above summarized methods.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A 2-input vector permutation instruction operates upon two vector inputs to produce a vector output. The first vector input is a "control vector" and the second vector input is a "table vector". The vector output is the "result vector". The control vector (array of N elements) is created that determines which table vector element will fill the corresponding position in the result vector. Consider the following example, where entries are indexed from 0 to 15:

8-element Control Vector: 4 8 3 9 1 7 5 15 2 12 11 1 13 0 14 10

16-element Table Vector: 3 5 7 9 11 13 15 1 0 2 4 6 8 10 12 14

8-element Result Vector: 11 0 9 2 5 1 13 14 7 8 6 5 10 3 12 4

In the example, the first control vector entry has a value 4 in it, which implies that table vector entry 4 (11) should be placed in the first entry of the result vector. The 7th entry in the control vector has a value of 5 which implies that the 6th entry in the table (13) should be placed in the 7th entry of the result vector. With the vector permutation operation, all 16 entries in the result vector are filled in following this method in one processor clock cycle.

A 3-input vector permutation operates similarly. The only difference is that the control vector selects inputs from two different tables. For example, for an 8 bit implementation, the first nibble (i.e. the first four bits) might be a "one" or a "zero" to select between two different tables, and the second nibble will select one of 16 table entries of the selected table. An example of a vector permutation hardware instruction is the vperm instruction of the Power PC Altivec Processor. Other processors may offer their own instructions. For more information on AltiVec, please see <http://www.simdtech.org/altivec> and the reference manual (dated February 2002) at <http://www.freescale.com/files/32 bit/doc/ref-manual/ALTIVECPEM.pdf>

Figure 1:
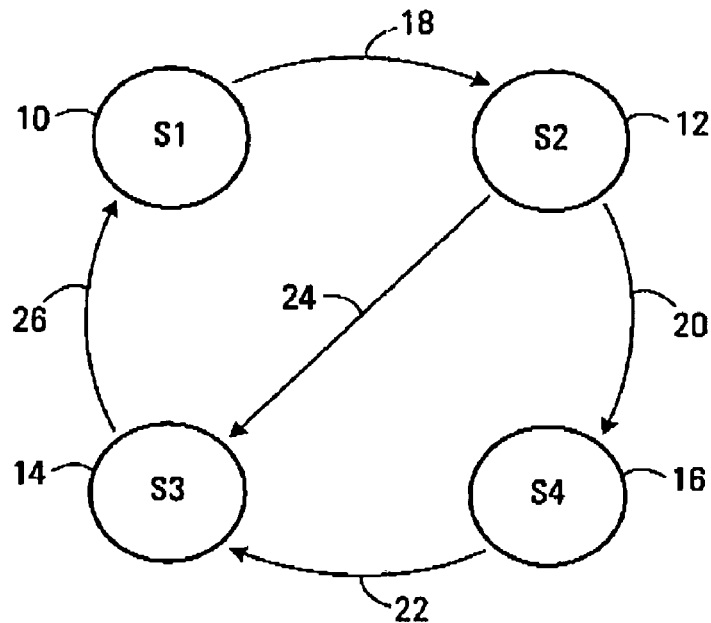
FIG. 1 is a state transition diagram for a simple state machine.
Figure 2:
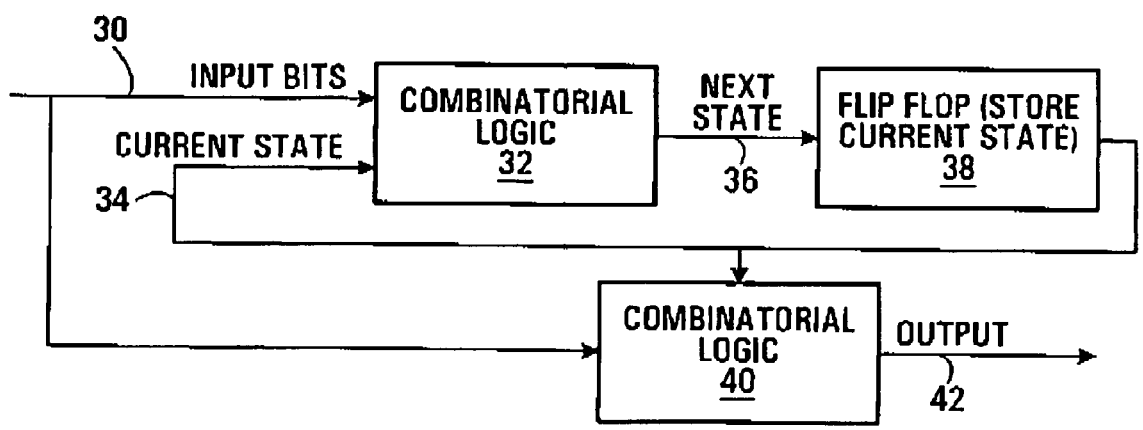
FIG. 2 is a block diagram of a conventional hardware implementation of a state machine.
Figure 3:
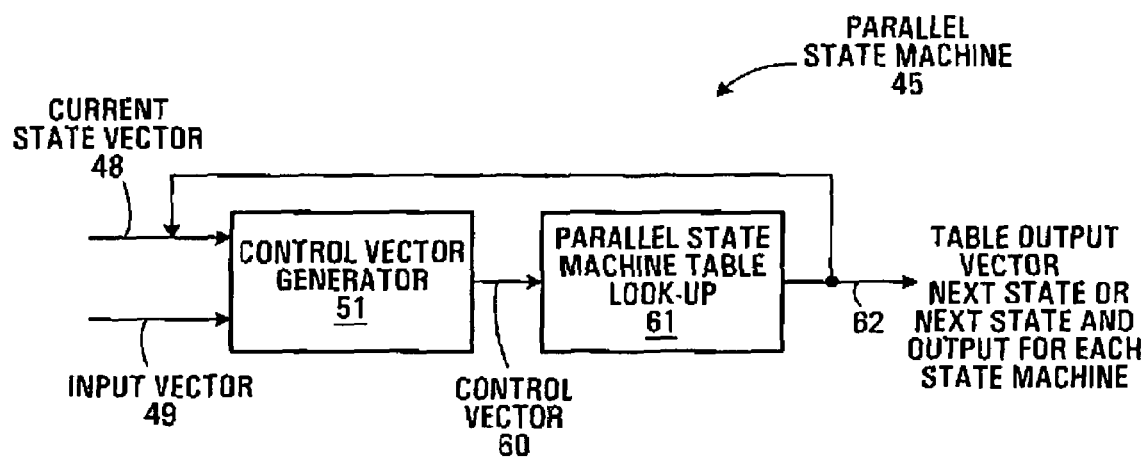
FIG. 3 is a block diagram of a hardware implementation of a parallel state machine provided by an embodiment of the invention.

Referring now to FIG. 3, shown is a block diagram of a parallel state machine implementation provided by an embodiment of the invention, hereinafter referred to simply as a "parallel state machine". The parallel state machine 45 receives as input a current state vector 48 and an input vector 49. The current state vector 48 contains the current state for each of a plurality of state machines that are to be implemented in parallel. Similarly, the input vector 49 contains the input bits for each of the plurality of state machines. A control vector generator 51 takes the current state vector 48 and the input vector 49 and generates a control vector 60. The control vector 60 contains one element for each state machine, and the element consists of a combination of the current state for that state machine and the input for that state machine taken from the current state vector 48 and the input vector 49. The control vector 60 is then used in conjunction with table look-up information to perform a table look-up operation 61 to generate a table output vector 62. The table output vector 62 contains an element for each state machine. Each element of the table output vector contains the next state for that state machine. In some embodiments, the table output element for a given state machine will also include bits to be output for that state machine.

The implementation of the parallel state machine of FIG. 3 will vary depending upon the number of bits used to represent the current state, the number of bits in the input, and the number of bits in the output. If the total number of combined bits in the current state and input is N, then the parallel table look-up operation 61 will need to operate with $2^N$ table values. The table values may simply consist of the next state for each state machine. However, if the size of each element in the table look-up is large enough to also store the output bits for a given state machine, then each element in the table look-up 61 may contain both the next state and output information. Alternatively, a separate parallel table look-up operation (not shown) may be implemented to take the next state produced by the first table look-up operation 61 and the current input vector 49 and determine the output for each of the state machines in parallel.

Figure 4A:
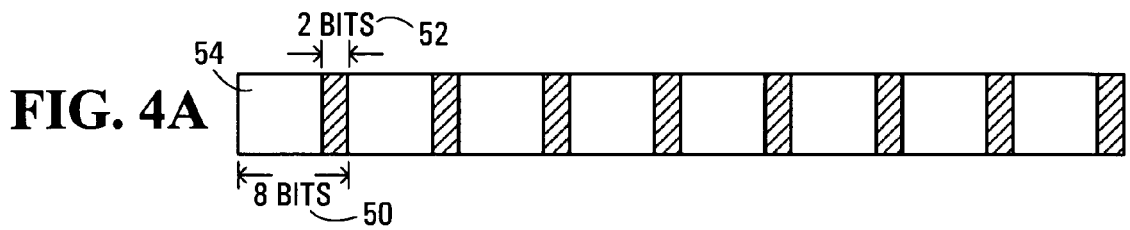
FIGS. 4A through 4D are example vectors for use with the parallel state machine of FIG. 3.

A specific example will now be given with reference to FIGS. 4A through 4D where it is assumed the state is 2 bits, the input is 3 bits and the output is 6 bits. FIG. 4A shows an example of a current state vector 48. In this case, the current state vector 48 consists of eight elements, and a single element 50 consists of eight bits. Each element 50 uses two bits 52 to store the current state leaving six bits available for other purposes.

Figure 4B:
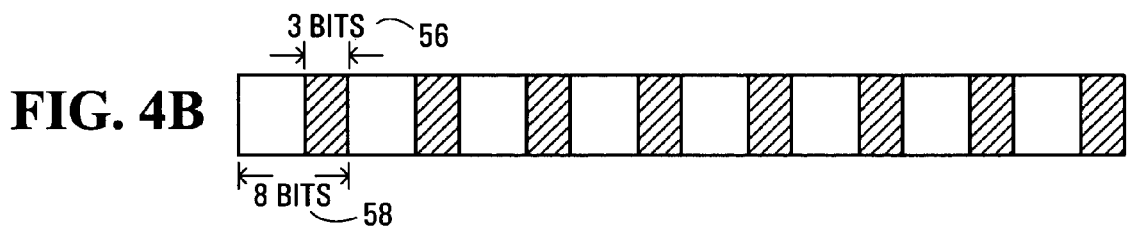

FIG. 4B shows an example of an input vector 49. Again, there are eight elements 58. Each element contains three bits of input 56.

Figure 4C:
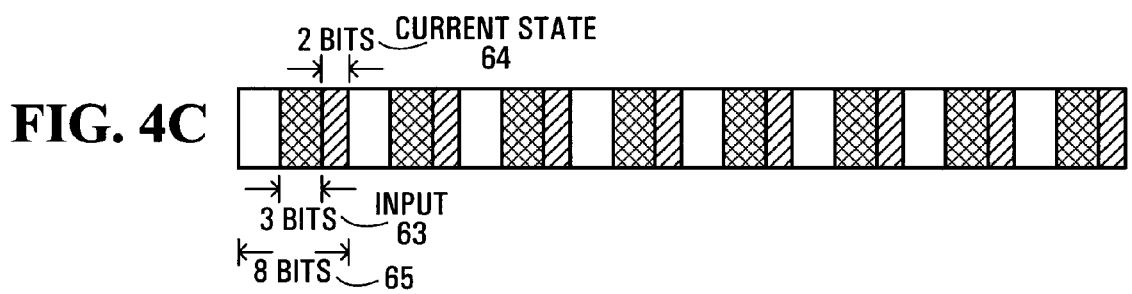

FIG. 4C shows an example of a control vector 60 that would be produced by the control vector generator 51 for this example. In this case, there are eight elements 65 in the control vector 60. Each element 65 contains three bits for the input 63, and two bits for the current state 64. There are three unused bits for each element in this case.

Figure 4D:
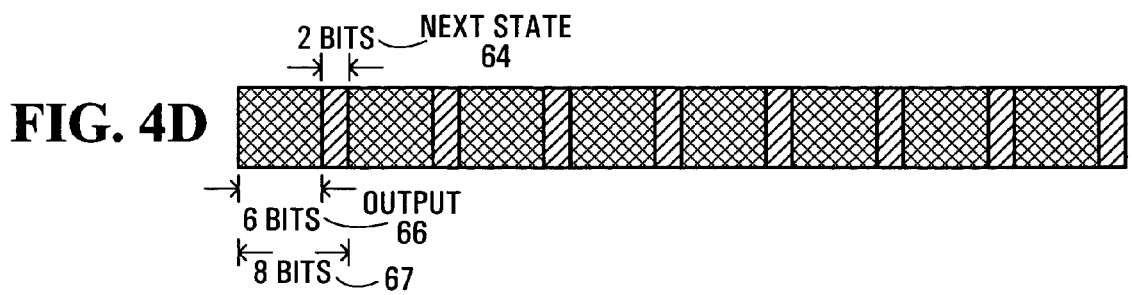

Finally, FIG. 4D shows an example of a table output vector 62. The table output vector 62 again has eight elements 67. Each element 67 has two bits for the next state 64. In this example, it is assumed there are six bits of output that are generated at each state transition. Since these bits will fit within an element of the table output vector 62, they are shown as part of the table output at 66 for each element.

This table output vector would then be fed back through to the control vector generator 51 which would extract the necessary next state bits for generating the next control vector 60.

The example of FIGS. 4A through 4D has been very specific, with two bits being used to represent the state, three bits to represent the input, and six bits to represent the output. With two bits to represent the current state, four different states can be represented for a given state machine. More generally, any number of states can be implemented so long as an appropriate number of bits are used to represent the current state. Similarly, while three bits are shown to represent the input, more generally any number of input bits may be employed. Similarly, while six bits have been used to represent the output, more generally, any number of bits can be used to represent the output. The example is specific to eight state machines being implemented in parallel. More generally, any number of state machines can be implemented in parallel subject to any limitations on the parallel table look-up operation of a given hardware platform. In some embodiments, the parallel table look-up operation 61 proceeds using the above described vector permutation operation. In some embodiments, 16 parallel state machines are implemented.

Figure 5:
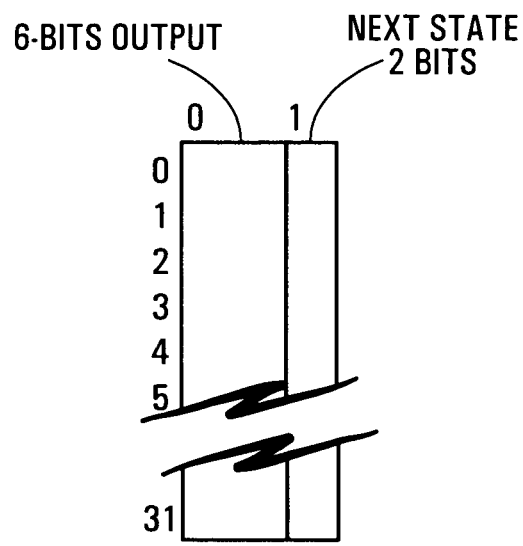
FIG. 5 is an example of a parallel table look-up.

FIG. 5 shows an example of the contents of the table used in the parallel table look-up operation for the particular state, input and output sizes of FIG. 4. The table vector is simply a table with indices being the combination of the current state and the input bits and the content being the next state and the output bits as determined by the original state diagram. In this case, since there are two bits of current state and three bits of input, there are a total $2^5$ different combinations that need to represented and as such the table contains 32 entries. Each entry is eight bits, and contains two bits for the next state and six bits for the output.

The control vector generator 51 uses any appropriate technique to combine the current state vector 48 with the input vector 49 to produce the control vector 60. Perhaps the least complex way to do this is to shift the input bits left by the number of bits required for the state bits. For example, if the state machine has eight states and four inputs, three state bits are required and two input bits are required. The two input bits can be shifted left by three bits and then combined with three state bits to form a five bit control vector entry.

Preferably, the entire table used in the parallel table look-up operation is stored in a first register and the control vector 60 is stored in a second register. In this manner, two register inputs can be provided to the parallel look-up table operation with the result being stored in an output register. Using this technique, all of the parallel results are filled in during one processor clock cycle as the entire table and input are stored in internal registers of a vector processor as opposed to general purpose memory which is much slower.

As mentioned above, the table output vector is a combination of the next state and any output of the state machine. Note that if more outputs are required than what can be stored in a single look-up, multiple look-ups can be done with the same control vector with only a minimal performance penalty. The part of the vector that contains the next state is then loaded into the current state ready for a subsequent iteration of the state machines. Finally, the outputs of the state machine are ready to be used directly, or as triggers for the generation of messages to traditional software entities.

For example, if a platform is employed that allows for a parallel table lookup into a table with $2^N$ entries with each entry indexed by N bits, but the state machine requires $2^{M+N}$ entries with each entry indexed by M+N bits of current input plus previous state, then M tables can be created, preferably all stored in registers for quick access, and each containing $2^N$ entries. Then, $2^M$ parallel lookups are performed using N bits of the input to the parallel table lookup step to produce $2^M$ outputs. Finally, the remaining M bits of the input are used to select between the $2^M$ outputs. This is all done in a parallel manner for a set of state machines.

In a particular example, if a vector permutation operation is used for the table lookup, and the vector permutation operates on vectors containing 16 1-byte elements, but the input (current input bits plus previous state) to the state machine is five bits requiring 32 possible outputs, then two 16 element table look-up vectors are maintained. Four bits of the five bits are used to look up a respective element in each of the two 16 element vectors for each of 16 parallel state machines, and the remaining bit of the input selects between the two elements for each of 16 parallel state machines.

Also, for embodiments featuring the two input vector permutation, more elements can be processed with a single instruction. For example, for a two input vector permutation operating on 16 1-byte element vectors, 32 1-byte elements can be stored in two 16 element registers and operated upon with a single vector permutation instruction for each of 16 parallel state machines.

Figure 6:
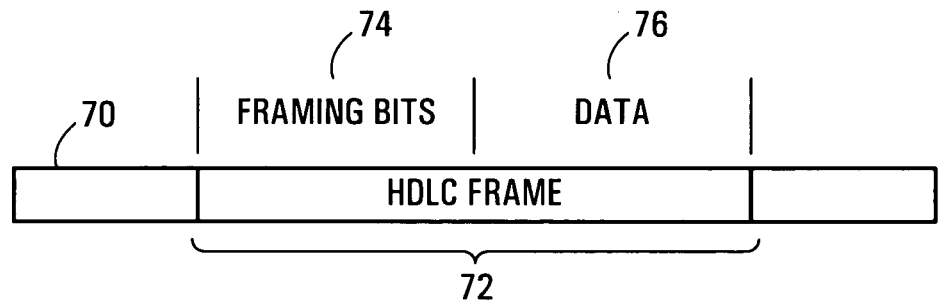
FIG. 6 is an example of an HDLC frame.
Figure 7:
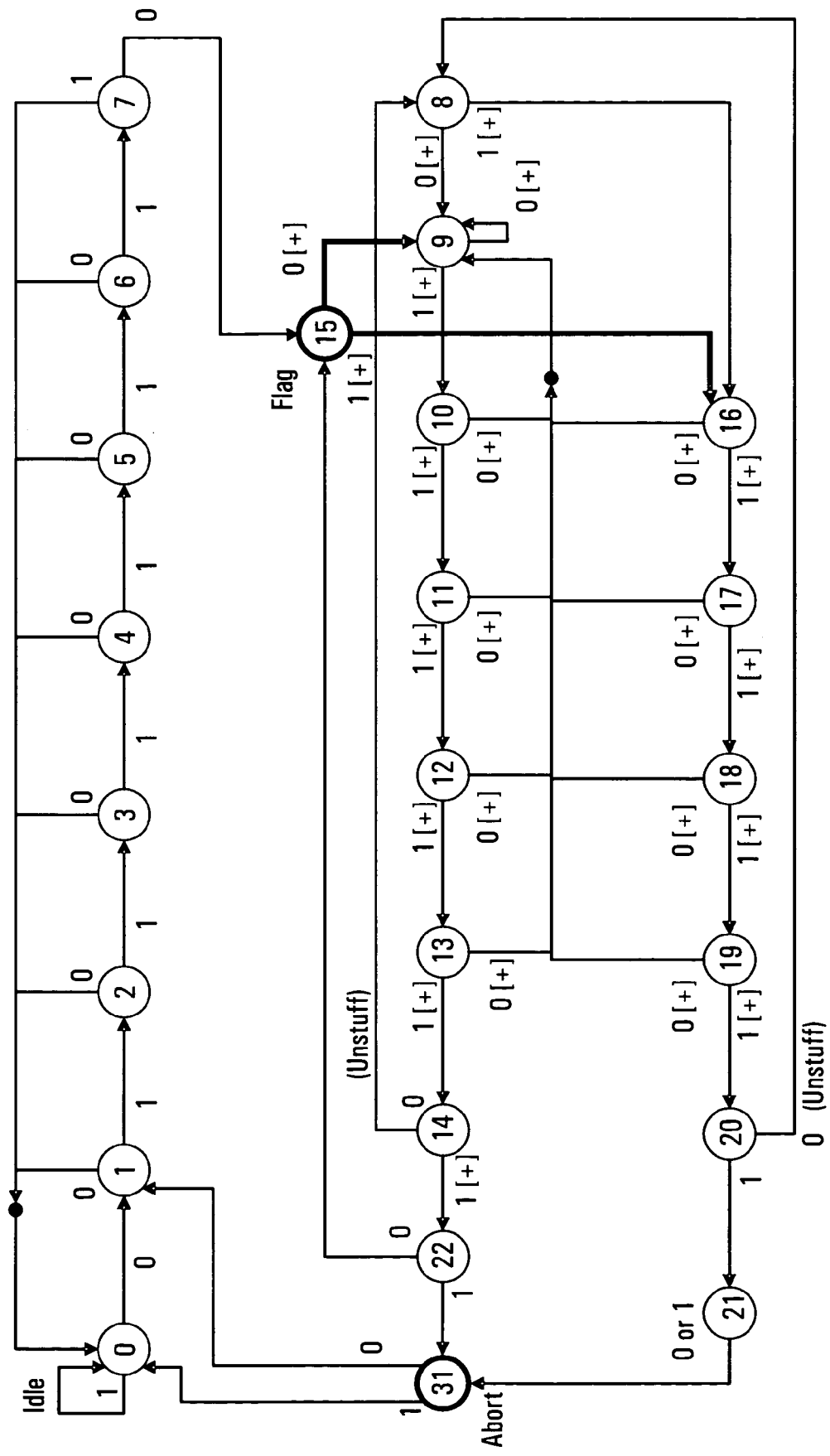
FIG. 7 is a state machine implementation of the HDLC bits unstuffing portion of the HDLC protocol.

An example application of the parallel state machine will now be described with reference to FIGS. 6 and 7. FIG. 6 shows a bit stream 70 containing an HDLC (high-level data link control) frame 72. HDLC frames 72 are typically embedded at unknown locations within a bit stream. In order to perform framing on the HDLC frame, framing bits 74 are inserted at the start of each frame 72, and these framing bits are followed by data portion 76. The framing bits consist of a "0", six "1"s and a "0" inserted at the start of each frame and at the end of each frame. In order that six "1"s in the data portion 76 are not confused with the framing bits, any occurrence of six "1"s in the data is adjusted by bit stuffing a "0" following any six "1"s at the transmitter. At the receiver, the receiver looks through the received bit stream and looks for the framing bits. This searching must be done one bit at a time in the receiver. Also, the receiver must look for and undo the bit replacements that were performed at the transmitter. This consists of looking for sequences of five "1"s in a row followed by a "0" which the receiver handles by removing the "0". HDLC is a typical data link layer (OSI Layer 2) protocol. See for instance <http://www.erg.abd-n.ac.uk/users/gorry/course/dl-pages/hdlc-framing.html> which describes the HDLC flag and 0-bit insertion technique.

An embodiment of the invention is used to implement the receiver processing of HDLC frames in parallel for a plurality of received bit streams. To do this, the processing performed at the receiver is converted into a state machine. An example implementation of this state machine is shown in FIG. 7.

This state machine has one input bit, one output bit and 32 states. Thus the state can be represented by 5 bits. The look-up table has 64 entries, one for each current state and for each 6 bit permutation consisting of one input bit and 5 state bits. The output of the table is a 6 bit value containing 5 bits for that next state and one bit for the output. Table 1 below is an example of a look-up table for the HDLC state machine.

TABLE 1

| Input<br>1 bit | Current<br>State<br>5 bits | Next<br>State<br>5 bits | Output<br>1 bit |
|---|---|---|---|
| 0 | 0' | 1 | 0 |
| 0 | 1' | 0 | 0 |
| 0 | 2' | 0 | 0 |
| 0 | 3' | 0 | 0 |
| 0 | 4' | 0 | 0 |
| 0 | 5' | 0 | 0 |
| 0 | 6' | 0 | 0 |
| 0 | 7' | 8 | 0 |
| 0 | 8' | 9 | 1 |
| 0 | 9' | 24 | 1 |
| 0 | 10' | 24 | 1 |
| 0 | 11' | 24 | 1 |
| 0 | 12' | 24 | 1 |
| 0 | 13' | 24 | 1 |
| 0 | 14' | 24 | 1 |
| 0 | 15' | 9 | 1 |
| 0 | 16' | 8 | 0 |
| 0 | 17' | 24 | 1 |
| 0 | 18' | 24 | 1 |
| 0 | 19' | 24 | 1 |
| 0 | 20' | 24 | 1 |
| 0 | 21' | 24 | 1 |
| 0 | 22' | 17 | 0 |

TABLE 1-continued

| Input<br>1 bit | Current<br>State<br>5 bits | Next<br>State<br>5 bits | Output<br>1 bit |
|---|---|---|---|
| 0 | 23' | 31 | 0 |
| 0 | 24' | 24 | 1 |
| 0 | 25' | 24 | 1 |
| 0 | 26' | 24 | 1 |
| 0 | 27' | 24 | 1 |
| 0 | 28' | 24 | 1 |
| 0 | 29' | 17 | 0 |
| 0 | 30' | 15 | 0 |
| 0 | 31' | 1 | 0 |
| 1 | 0' | 0 | 0 |
| 1 | 1' | 2 | 0 |
| 1 | 2' | 3 | 0 |
| 1 | 3' | 4 | 0 |
| 1 | 4' | 5 | 0 |
| 1 | 5' | 6 | 0 |
| 1 | 6' | 7 | 0 |
| 1 | 7' | 0 | 0 |
| 1 | 8' | 18 | 1 |
| 1 | 9' | 10 | 1 |
| 1 | 10' | 11 | 1 |
| 1 | 11' | 12 | 1 |
| 1 | 12' | 13 | 1 |
| 1 | 13' | 14 | 1 |
| 1 | 14' | 16 | 0 |
| 1 | 15' | 18 | 1 |
| 1 | 16' | 31 | 0 |
| 1 | 17' | 18 | 1 |
| 1 | 18' | 19 | 1 |
| 1 | 19' | 20 | 1 |
| 1 | 20' | 21 | 1 |
| 1 | 21' | 22 | 1 |
| 1 | 22' | 23 | 0 |
| 1 | 23' | 31 | 0 |
| 1 | 24' | 25 | 1 |
| 1 | 25' | 26 | 1 |
| 1 | 26' | 27 | 1 |
| 1 | 27' | 28 | 1 |
| 1 | 28' | 29 | 1 |
| 1 | 29' | 30 | 0 |
| 1 | 30' | 31 | 0 |
| 1 | 31' | 0 | 0 |

This becomes very useful in a telecommunications context where a given communications node is performing HDLC processing on bit streams received from a large number of transmitters. By enabling the communications node to perform this HDLC processing in parallel, the performance of the node can be enhanced.

In one example implementation for any of the above described embodiments, the Altivec processor is used for the parallel look-up operations. The Altivec includes the vperm instructions to implement the above discussed vector permutation operation. The Altivec processor also has vector operations for performing bit shifting and bit wise OR operations. These can be used to generate the control vector from the input and the previous state. For example, the following logic can be used to shift input bits three bits to the left and combine them with state bits, where it is assumed Vcontrol has been cleared first:

Vcontrol←Vinput<<3
Vcontrol←Vcontrol or Vcurrentstate where Vcontrol is the control vector, Vinput is the input vector and Vcurrentstate is the current state input.

For the particular HDLC example given above, an Altivec implementation of the table lookup might be implemented as follows to implement 16 parallel state machines:

store the 64 table lookup entries in four 16-element vector registers vtable1, vtable2, vtable3, vtable4;

generate 16 element control vector containing the 5 state bits (more generally any five bits of the 6 bits of state+ current input);

use 16 element control_vector to look-up two sets of 16 element parallel outputs v_table_out1 and v_table_out2:

vperm v_table_out1, vtable1, vtable2, control_vector
vperm v_table_out2, vtable3, vtable4, control_vector select between v_table_out1 and v_table_out2 for each of 16 state machines on the basis of the single input bit (more generally, the remaining bit of the six bits of current state plus current input).

In the embodiments described above, a parallel table look-up operation is performed in implementing the state machines. More generally, the control vector can be used to determine the next state, and any output bits, using any parallel technique. For example, in one specific implementation, a parallel set of combinatorial logic is used to implement this portion of the parallel state machine.

In other embodiments, a computer readable medium is provided that has instructions stored thereon for execution by a vector processor to implement one of the methods described herein. In further embodiments, a parallel state machine calculator is provided that executes one of the methods described herein using any appropriate combination of one or more of software, hardware, firmware.

Numerous modifications and variations of the present invention are possible in light of the above teachings. It is therefore to be understood that within the scope of the appended claims, the invention may be practiced otherwise than as specifically described herein.

We claim:

1. A method of performing state machine transitions comprising:
   combining an input vector containing at least one input bit for each of a plurality of state machines with a current state vector containing at least one current state bit for each of the plurality of state machines to generate a control vector; and
   using the control vector, determining in a parallel manner at least one bit representing a next state for each state machine;
   wherein determining comprises performing a first parallel table look-up using the control vector to look-up the first respective table output for each of the state machines.

2. The method of claim 1 wherein the respective table output comprises at least one bit representing a next state for each state machine and at least one output bit for each state machine.

3. The method of claim 1 further comprising:
   performing at last a second parallel table look-up using the control vector to look-up at least a second respective table output for each of the state machines, wherein the first and the at least a second table outputs for each state machine collectively comprise at least one bit representing the next state and output bits.

4. The method of claim 1 further comprising:
   storing a table for use in the parallel table look-up in a first register;
   storing the control vector in a second register;
   providing the fast register and second register as inputs to a vector permutation operation to implement the parallel table look-up.

5. The method of claim 1 further comprising:
   storing a table for use in the parallel table look-up partly in a first register and partly in a second register;
   storing the control vector in a third register;

providing the first register, the second register and the third register as inputs to a three input vector permutation operation to implement the parallel table look-up.

6. The method of claim 1 wherein the parallel table look-up is performed using a vperm instruction.

7. The method of claim 1 adapted to implement a plurality of HDLC state machines in parallel, wherein the current state is represented by five bits and the current input is represented by one bit for each state machine.

8. The method of claim 7 comprising:
storing 64 table look-up entries in four 16-element vector registers;
generating the control vector as a 16 element control vector containing five bits of the six bits of current state and current input;
using the control vector to look-up two sets of 16 element parallel outputs;
selecting between two elements in the two parallel outputs for each of 16 state machines on the basis of the remaining bit of the six bits for that state machine.

9. A parallel state machine calculator adapted to implement the method of claim 1.

10. A method of performing state machine transitions comprising:
combining an input vector containing at least one input bit for each of a plurality of state machines with a current state vector containing at least one current state bit for each of the plurality of state machines to generate a control vector; and
using the control vector, determining in parallel manner at least one bit representing a next state for each state machine;
wherein combining the input vector containing at least one input bit for each of the plurality of state machines with the current state vector containing at least one current state bit for each of the plurality of state machines to generate the control vector comprises:
producing a shifted vector by performing a vector shift operation on one of the input vector and the current state vector such that the bits of each element are shifted by enough bits to store bits of the other of the input vector and the current state vector current state; and
executing a vector bit-wise OR of the shifted vector with the other of the input vector and the current state vector to produce the control input.

11. A computer readable medium having processor executable instructions thereon for implementation by a vector processor, the instructions providing a method of performing state machine transitions comprising:
combining an input vector containing at least one input bit for each of a plurality of state machines with a current state vector containing at least one current state bit for each of the plurality of state machines to generate a control vector; and
using the control vector, determining in a parallel manner at least one bit representing a next state for each state machine;
wherein determining comprises performing a first parallel table look-up using the control vector to look-up the first respective table output for each of the state machines.

12. The computer readable medium of claim 11 wherein the respective table output comprises at least one bit representing a next state for each state machine and at least one output bit for each state machine.

13. The computer readable medium of claim 11 wherein the method further comprises:
performing at least a second parallel table look-up using the control vector to look-up at least a second respective table output for each of the state machines, wherein the first and the at least a second table outputs for each state machine collectively comprise at least one bit representing the next state and output bits.

14. The computer readable medium of claim 11 wherein the method further comprises:
storing a table for use in the parallel table look-up in a first register;
storing the control vector in a second register;
providing the first register and second register as inputs to a vector permutation operation to implement the parallel table look-up.

15. The computer readable medium of claim 11 wherein the method further comprises:
storing a table for use in the parallel table look-up partly in a first register and partly in a second register;
storing the control vector in a third register;
providing the first register, the second register and the third register as inputs to a three input vector permutation operation to implement the parallel table look-up.

16. The computer readable medium of claim 11 wherein the parallel table look-up is performed using a vperm instruction.

17. The computer readable medium of claim 11 adapted to implement a plurality of HDLC state machines in parallel, wherein the current state is represented by five bits and the current input is represented by one bit for each state machine.

18. The computer readable medium of claim 17 wherein the method further comprises:
storing 64 table lookup entries in four 16-element vector registers;
generating the control vector as a 16 element control vector containing five bits of the six bits of current state and current input;
using the control vector to look-tip two sets of 16 element parallel outputs;
selecting between two elements the two parallel outputs for each of 16 state machines on the basis of the remaining bit of the six bits for that state machine.

19. A computer readable medium having processor executable instructions thereon for implementation by a vector processor, the instructions providing a method of performing state machine transitions comprising:
combining an input vector containing at least one input bit for each of a plurality of state machines with a current state vector containing at least one current state bit for each of the plurality of state machines to generate a control vector; and
using the control vector, determining in a parallel manner at least one bit representing a next state for each state machine;
wherein combining the input vector containing at least one input bit for each of the plurality of state machines with the current state vector containing at least one current state bit for each of the plurality of state machines to generate the control vector comprises:

producing a shifted vector by performing a vector shift operation on one of the input vector and the current state vector such that the bits of each element are shifted by enough bits to store bits of the other of the input vector and the current state vector current state; and executing a vector bit-wise OR of the shifted vector with the other of the input vector and the current state vector to produce the control input.

* * * * *